(No Model.)

J. M. BRYANT.
THILL OR POLE COUPLING.

No. 599,382. Patented Feb. 22, 1898.

Witnesses
Harry Kilgore
F. D. Merchant

Inventor
John M. Bryant
By his Attorney
Jas. F. Williams

UNITED STATES PATENT OFFICE.

JOHN M. BRYANT, OF MINNEAPOLIS, MINNESOTA.

THILL OR POLE COUPLING.

SPECIFICATION forming part of Letters Patent No. 599,382, dated February 22, 1898.

Application filed February 1, 1897. Serial No. 621,378. (No model.)

*To all whom it may concern:*

Be it known that I, JOHN M. BRYANT, a citizen of the United States, residing at Minneapolis, in the county of Hennepin and State of Minnesota, have invented certain new and useful Improvements in Antirattling Thill or Pole Couplings; and I do hereby declare the following to be a full, clear, and exact description of the invention, such as will enable others skilled in the art to which it appertains to make and use the same.

My invention relates to couplings for connecting thills and poles to carriages or other vehicles, and has for its principal objects, first, to provide a coupling which is antirattling or silent in its action, and, second, to provide a coupling in which the coöperating bearing-sections may be interlocked together or separated simply by the manipulation of said parts themselves.

To the ends above noted my invention consists of the novel devices and combinations of devices hereinafter described, and defined in the claims.

The preferred form of my invention is illustrated in the accompanying drawings, wherein like characters indicate like parts throughout the several views.

Figure 1:
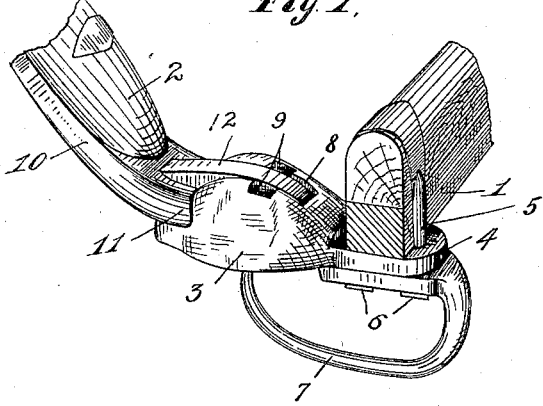
Figure 2:
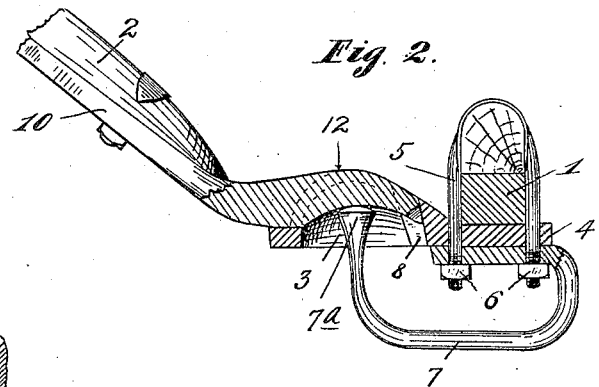
Figure 3:
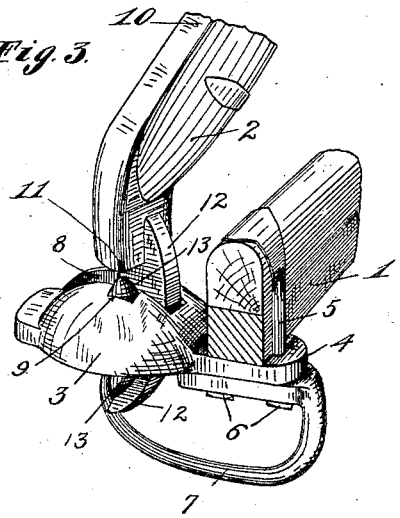
Figure 4:
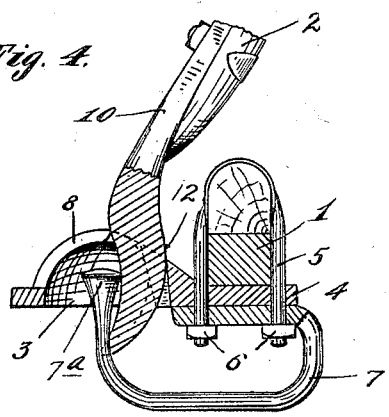

Figure 1 is a perspective view, with some parts shown in section and others broken away, showing the preferred form of my improved coupling applied in working position to secure one of the thills of a vehicle to the front axle, the said thill being shown in a position which it might occupy when hitched to the draft-animal. Fig. 2 is a view, partly in side elevation and partly in vertical longitudinal section, showing the same parts and illustrating the same positions of the same as illustrated in Fig. 1. Fig. 3 is a perspective view of the parts shown in Fig. 1, but showing the thill turned upward and backward into an extreme position or into a position which it cannot possibly reach while hitched to the draft-animal; and Fig. 4 is a view, partly in side elevation and partly in vertical longitudinal section, illustrating the position of the parts of the coupling shown in Fig. 3.

1 indicates the front axle, and 2 one of the thills, of a carriage or other vehicle. Of the parts of the coupling, 3 indicates the female member in the form of a bearing-socket or inverted cup, provided with a rearwardly-projecting lug or foot portion 4, which is rigidly secured to the under side of the axle 1 by means of a screw-threaded clip or U-bolt 5, provided with nuts 6. This U-bolt 5 is placed straddle of the axle 1, with its screw-threaded ends turned downward and passed through suitable perforations in the lug or foot portion 4 and also through perforations in the butt-end of a spring 7, to be hereinafter more specifically described. The nuts 6 clamp directly onto the base of the spring 7 to clamp the same against the lug or foot portion 4 and rigidly secure both of said parts to the axle. The socket or female section 3 is provided with a longitudinal slot 8, which is provided near its rear extremity with laterally-expanded notches or lug-passages 9.

In the construction illustrated the thill draft-iron 10 is formed at its projecting end with lateral shoulders 11 and with a rearwardly-projecting centrally-located vertical web or segmental blade 12. This web or blade 12 is of such lateral dimension that it will work freely in the slot 8. The web or blade portion 12 constitutes the male member of the coupling or bearing sections. Commencing a short distance from the shoulders 11 of the draft-iron 10, the section or web 12 is provided with laterally-projecting segmental lock lugs or flanges 13, that run nearly, but not quite, to the tip end of the same. When the thill is turned into an upright position, a position which, of course, it cannot occupy when hitched, so as to bring the lock lugs or flanges 13 substantially in vertical line with the lug-passages 9, the web or male section 12 may be forced endwise into the slot 8 and said lock lugs or flanges 13 may be passed through said lug-passages 9. When the lock lugs or flanges 13 have been passed through the lug-passages 9, they may be turned into engagement with the inner concave bearing-surface of the female or socket section 3, and the thills may then be turned downward into positions in which they may be hitched to the draft-animal. The engagement of the lock lugs or flanges 13 with the concave bearing-surface of the female or socket section 3 permits the free pivotal movement of the thills throughout all the possible movements which the thills may be given while hitched to the draft-animal and throughout all of these movements holds the male and female bearing-sections positively interlocked together, so that they cannot be disengaged while the thills are hitched.

To render the coupling above described antirattling or silent in its action, a suitable spring is employed, preferably of the form indicated at 7 and briefly referred to above. This spring 7 is in the form of a hammer-spring, the free end of which extends substantially vertical and terminates in a bearing-head $7^a$, that bears against the inner concave surface of the web or male section 12, thus pressing the convex bearing-surfaces of the lock lugs or flanges 13 tightly into frictional engagement with the concave bearing-surfaces of the female or socket section 3. The action of said spring 7 on the web or male section 12 is preferably such that when the thill is turned into the extreme or raised position above indicated the head $7^a$ will tightly press the convex edge of the said web 12 against the rear wall formed at the rear extremity of the slot 8. This friction is such that when the thills are unhitched from the horse and turned into the extreme positions indicated and then slightly raised or drawn upward, so that the upper extremities of the lock lugs or flanges 13 will engage the lug-passages 9, the thills will be frictionally held against vertical movement and will be positively held against downward pivotal movement. To throw the thills downward into their hitching position, it is only necessary, first, to press slightly downward on the thills without attempting to turn the same on their pivots, thus disengaging the lock lugs or flanges 13 from the passages or notches 9, and after this is done the thills may be readily turned or allowed to fall downward by pivotal movement. It is of course perfectly obvious that when the thills are turned upward, as above indicated, they may be disconnected from the vehicle simply by picking the same up by a vertical endwise movement, an action just reverse from that which is required to connect or couple the same to the vehicle.

It will of course be understood that while I have in the above specific illustration shown the coupling in connection with a thill the same is equally well adapted for use as a pole-coupling. When used as a pole-coupling, I should preferably form the male section or web 12 integral with one of the draft-irons of the pole in a manner very similar to that above described in connection with the thill draft-iron 10, although I do not, of course, limit myself to this construction. The only purpose served by the shoulders 11 of the draft-irons is to prevent the male section 12 from being forced through the slot 8 beyond the proper distance, as might be done in interlocking the parts together or when the thills or pole are used in backing up.

The importance of being able to readily secure the thills or pole in an upright position will be readily appreciated by all persons who have hitched horses to a carriage without assistance. However, a much more valuable feature is found in the extreme ease and quickness with which the thills or poles may be placed in working position and removed therefrom or interchanged one for the other. As above stated, this requires the simplest kind of manipulation of the thills or poles and can be accomplished with almost the same ease with which the said thills or pole may be picked from the floor or any other place and does not require the manipulation of a third device, such as a clamp or nut. This makes the device especially serviceable to liverymen or for livery-stable use, where it is necessary to constantly change and remove the thills and poles.

By actual usage of the above-described coupling I have demonstrated its efficiency and durability and have found it to be absolutely noiseless and free from rattling movements. Obviously it is extremely simple in construction and of correspondingly low first cost.

It will be understood, of course, that various alterations in the specific details of construction above set forth may be made without departing from the spirit of my invention.

What I claim, and desire to secure by Letters Patent of the United States, is as follows:

1. A thill or pole coupling, comprising the cup-like socket-section 3 provided with the slot 8 formed with notches or lug-passages 9, and the web or section 12 provided with the segmental lock-flanges 13, which parts are adapted to be interlocked, substantially as described.

2. A thill or pole coupling, comprising a cup-like socket-section provided with an extended slot formed with expanded notches or lug-passages, a web or male section provided with segmental lock-flanges projecting from its opposite sides, which parts are adapted to be interlocked, and a spring pressing against the inner surface or surfaces of said segmental lock-flanges, substantially as described.

3. A thill or pole coupling, comprising a cup-like socket-section 3 provided with the slot 8 formed with the notches 9, the web or section 12 provided with segmental lock-flanges 13, which parts are adapted to be interlocked, and the hammer-spring 7 secured to said section 3 and pressing against the concave surface of said section 12, said parts operating substantially as described.

In testimony whereof I affix my signature in presence of two witnesses.

JOHN M. BRYANT.

Witnesses:
JAS. F. WILLIAMSON,
F. D. MERCHANT.